INVENTORS:
WILMER B. POTEATE,
PETER C. WEYGANDT,
BY Henry W. Kaufmann
AGENT

United States Patent Office 3,423,614
Patented Jan. 21, 1969

3,423,614
INSIDE-OUT MOTION DAMPER
Wilmer B. Poteate and Peter C. Weygandt, West Chester, Pa., assignors to General Electric Company, a corporation of New York
Filed Dec. 9, 1966, Ser. No. 600,643
U.S. Cl. 310—93           7 Claims
Int. Cl. H02k *49/10;* H02p *15/00*

ABSTRACT OF THE DISCLOSURE

This invention, as embodied, comprises a central spherical assembly which is diamagnetic and electrically conductive which is fastened to a body whose oscillations are to be damped, and a fixed array of permanent magnets which surround the spherical assembly, being kept clear of it by magnetic repulsion, and having a net magnetic moment which interacts with any external ambient magnetic field.

---

This invention pertains to the art of damping mechanical motions, and more particularly to damping the oscillations of bodies in very low or zero gravity fields, as in free fall.

The preceding abstract in which accuracy has been subordinated to simplicity, is provided for the more precise indication of the field of novelty of this invention for the convenience of the public, but not for definition or bounding of the invention itself.

In copending application Ser. No. 362,216, entitled Motion Damper, filed Apr. 24, 1964, by Louis K. Davis, which application is assigned to the assignee of the present invention, it is taught how the damping of oscillations of a freely moving body not surrounded by matter of any appreciable density may be improved by connecting to the body a spherical shell of diamagnetic material, inside which there is provided a spherical body comprising an assembly of magnets which keep themselves clear of the spherical shell by magnetic repulsion, and provide a net magnetic moment which can interact with an external ambient magnetic field. Means are provided for damping any relative motion between the spherical shell and spherical body. The dissipation of large amounts of angular momentum is facilitated by the interaction between an external ambient magnetic field (e.g. the earth's) and the net magnetic moment of the spherical body, producing an effect as through the moment of inertia of the spherical body were much greater than in fact it is. For a more complete description of that invention, reference is hereby made to the cited application.

In the use of the invention described in the cited application, it has been found on at least one occasion that the body to which that novel damping device was attached behaved as if the diamagnetic spherical shell and the magnetic spherical body inside it had become attracted to each other in some fashion, so that relative motion between them had ceased to be completely free. At the time of the observation of this phenomenon no close examination was feasible; but it is supposed that a ferromagnetic particle of unknown origin was attracted to the magnetic internal spherical body, and adhered to the shell, tending to hold the inside sphere magnetically in a fixed attitude relative to the shell.

In order to minimize the probability of such an occurrence, we have invented an alternative form of damper having, inter alia, the novel feature that the magnetic portions of the damper of our invention are on the outer structure of the device, so that any ambient ferro- (or para-) magnetic particles may be expected to be attracted to and held harmlessly on the outside of the structure, without impairing freedom of relative motion between the inner and outer parts.

Thus the object of our invention is essentially to achieve the objects of the cited invention, and to eliminate what appears to be one of its potential disadvantages.

For the better understanding of our invention, we have provided figures of drawing in which.

Figure 1:
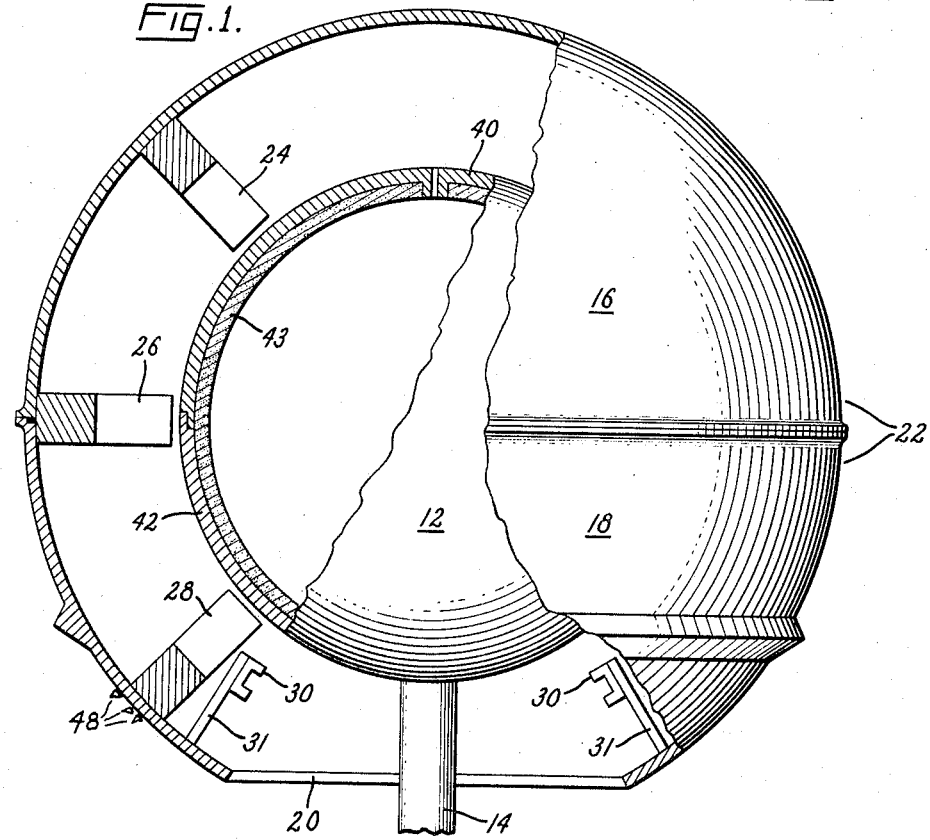
FIG. 1 represents partly in section an embodiment of our invention.
Figure 4:
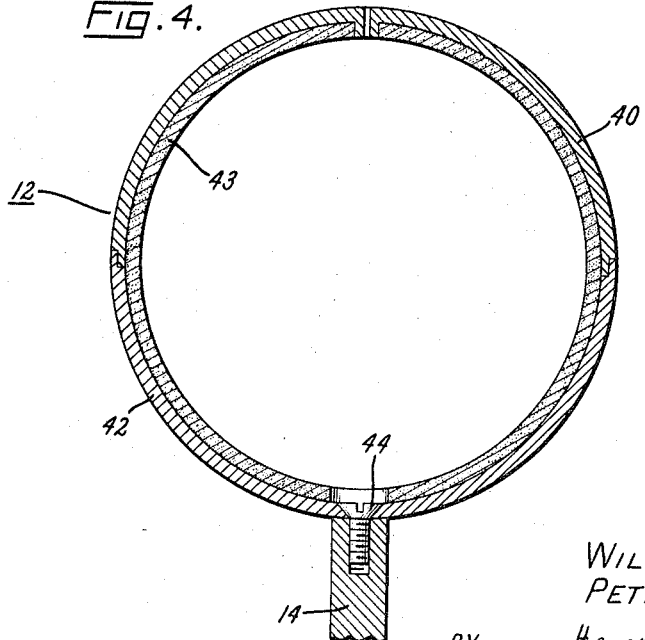
FIG. 4 represents schematically features of a part of the embodiment represented in FIG. 1.

Referring first to FIG. 1, there is represented a central spherical assembly 12, here partly sectioned, represented in detail in FIG. 4. A connecting member 14, which is nonmagnetic, extends from assembly 12 for connection to a body whose oscillations are to be damped, the usual practice of the known art being to achieve such connection by the use of an extensible rod extending between the damping device and the body to be stabilized, the rod being so long that it tends to align itself with the gradient of the local accelerational field (such as the gravitational field). Since this is part of the prior art and very well known to those skilled in it, no representation of it is given.

Figure 2:
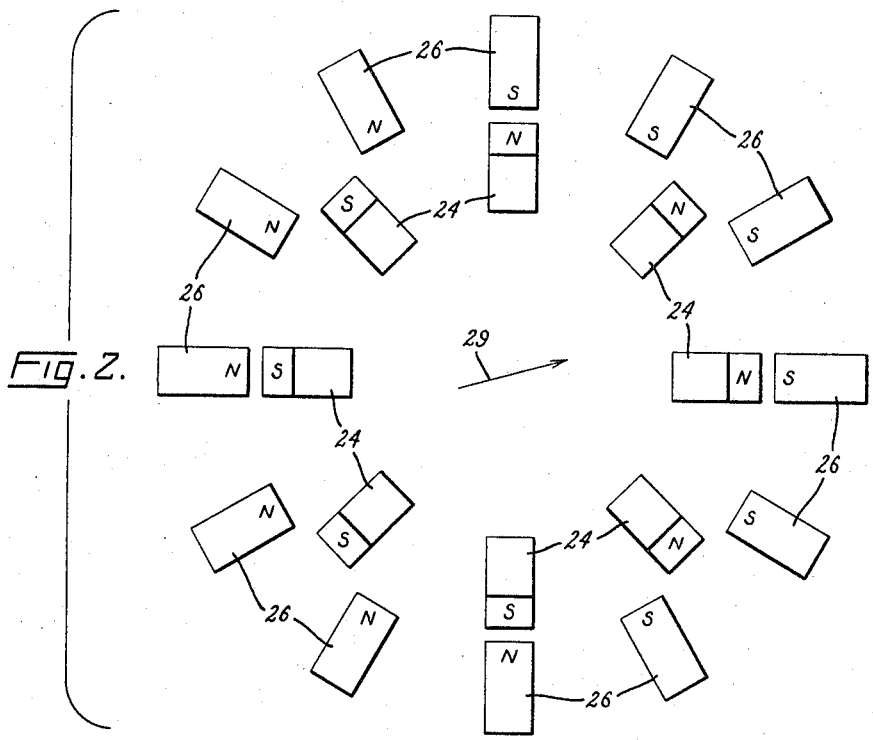
FIGS. 2 and 3 represent highly schematically a system of arrangement of the permanent magnets in the embodiment represented in FIG. 1.
Figure 3:
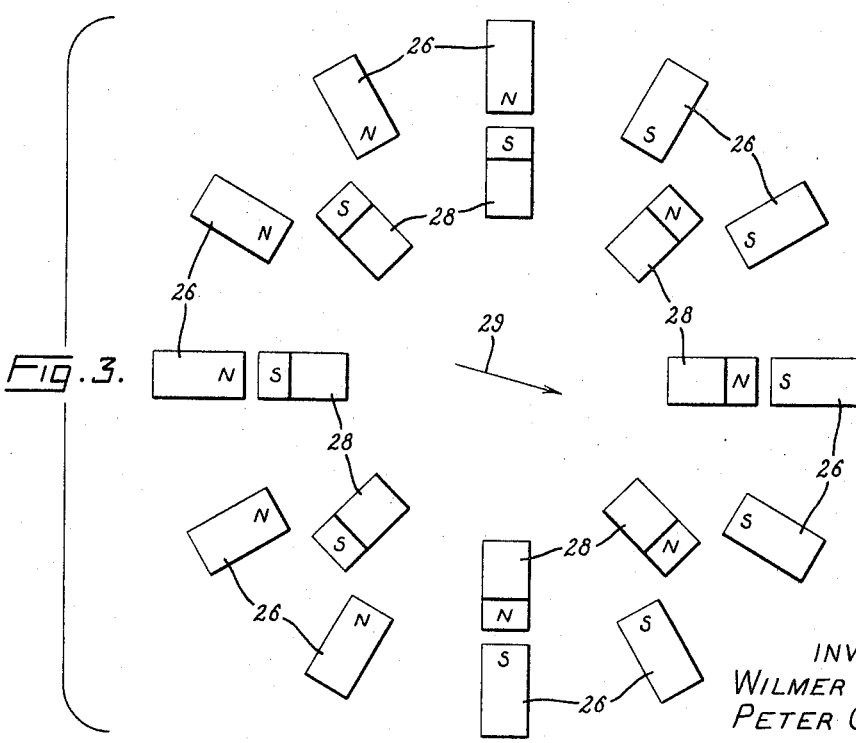

Surrounding assembly 12, and here represented as partly sectioned along a central plane, are two mating parts 16 and 18, of nonmagnetic material (which in a specific embodiment was an aluminum alloy) which are joined at their flanged portions by any convenient conventional fastening means. These parts 16 and 18 form a housing 22 having an approximately spherical shape, except for the opening 20 in housing part 18, which is required for the protrusion and free movement (over a limited angle) of connecting member 14. In a specific embodiment, the size of opening 20 was such as to permit member 14 to move thirty degrees in any direction from its central position. mounted on pads or bosses inside housing 22, composed of parts 16 and 18, there is represented a plurality of permanent magnets 24, 26, 28, which may conveniently be rectangular bars, as here represented, or the more readily available hollow circular cylinders. They are magnetized lengthwise, so that they are the equivalents of the conventional bar magnet. They may conveniently be of Alnico or other commercial permanent magnet material of high coercive force and flux density. While in FIG. 1 there is represented only one of each of magnets 24, 26, and 28, there is in fact a plurality of each of the thus identified magnets, which may be better explained by reference to FIGS. 2 and 3. FIG. 2 represents a view of the magnets alone as seen from the top of FIG. 1. Magnets 26 are seen to be twelve in number, equiangularly spaced around the circular meridian of housing 22. Magnets 24, eight in number, lie in a smaller circle, and are tilted with respect to the observer, showing an end and a side. Since they lie directly above magnets 28, they conceal these. In like manner FIG. 3 represents a view of the magnets alone as seen from the bottom of FIG. 1. In FIG. 3 magnets 26, viewed from the bottom, appear just as they do in FIG. 2 when viewed from the top; and magnets 28 appear just as magnets 24 appear in FIG. 2, magnets 28, when viewed from the bottom of FIG. 1 concealing magnets 24. Let it be assumed that the direction of the net magnetic moment desired for interaction with an external magnetic field is that represented by the arrow 29, whose head or point represents the north-seeking end of a magnet having the orientation proper to produce the desired moment. Then the polarity of the various magnets, as represented by the letters "N" for north-seeking or "S" for south-seeking, as represented is proper to produce the required direction of the net magnetic moment of the assembly. Further discussion of the magnet assembly will be deferred for continuation of the mechanical description. The magnets 24, 26, 28 are so arranged that their pole faces are close to the surface of spherical assembly 12. Since, as will be discussed further in more detail, spherical assembly 12 is diamagnetic and electrically conductive, the field at the end of each magnet will tend to repel assembly 12 from it, so that the net effect of the fields of all the magnets is to provide a force tending to keep housing 22 free of assembly 12, and free to rotate with respect to it, up to the limit imposed by connecting member 14 encountering the edge of opening 20. However, since assembly 12 is electrically conductive, such motion will be damped by eddy currents, in accordance with Lenz's law, which has been applied for many decades in watt hour meters, inter alia. A ring-shaped magnet 30 is also represented, whose function will be later described.

While in normal use in small accelerational fields, pole faces of magnets 24, 26, 28 will not come in contact with the surface of spherical assembly 12, during handling in strong gravitational fields such contact will occur, and it has been deemed advisable to coat the inner pole faces of the magnets 24, 26, 28 with a thin layer, not represented, of some low-friction plastic such as the fluorocarbons to prevent abrasion of the sphere by the pole faces (or vice versa). The clearance between the coated pole faces of the magnets and the spherical face of 12 was (in the assembly previously mentioned) approximately 0.090 inch, for a central location of the spherical assembly 12 within housing 22. To make the clearance or gap more nearly uniform across the face of a given magnet pole face, the faces were chamfered cylindrically by grinding to a radius slightly greater than the radius of the spherical face of assembly 12. This gave a fit less precise than spherical grinding would have achieved, but adequate, and mechanically much simpler to achieve.

Attention is now redirected to FIGS. 2 and 3, which show particularly the manner in which magnets 24, 26, 28 are arranged to produce the required repulsion of assembly 12 and yet produce a net magnetic moment in the totality of the array of all magnets 24, 26, 28 to interact with an external ambient magnetic field 29 here represented by an arrow. Since the individual magnets are quite close to the assembly 12, the field between a magnet pole face and the surface of 12 will not be greatly affected by the orientation of other similar magnets which are a comparatively large distance away. The field so identified determines the repulsive force which is required to maintain the free relationship between assembly 12 and housing 22. Since this force is not appreciably affected by the orientation of other magnets with respect to the particular magnet which produces it, and since this is true of all magnets 24, 26, 28 it follows that these magnets may be placed so that the north poles of all point within a quadrant of the desired direction of the north pole of the entire array. If a given group of magnets lies with its axes in a plane normal to the desired magnetic axis of the array, then the magnets in that group may be oriented in any way such that group in toto neutralizes itself. This may be done, for example, by having all north poles pointing inward (or outward); or by having alternate north and south poles pointing inward.

FIG. 4 represents the structure of spherical assembly 12, in section. In a particular embodiment, a copper shell of two hemispheres 40 and 42, about 0.085 inch thick, was sealed with room temperature vulcanizing rubber compound to a diamagnetic pyrolytic graphite sphere 43 about 0.070 inch thick. The connection of this assembly to connecting member 14 was achieved by a simple nonmagnetic screw 44 threaded into a tapped hole in member 14. It may be observed that the joint between hemispheres 40 and 42 is represented as a stepped or shouldered joint. This joint may constitute an actual insulating barrier between hemispheres 40 and 42, if it is sealed with rubber compound. If some other fastening means is employed, it is almost a certainty that the electrical conductivity across the joint will be poorer than that through the intact portion of either hemisphere.

The effect of this difference in conductivities for current flow in different directions (anisotropy) will be to produce different eddy-current damping for motion in different directions. In the particular representation of FIG. 1, rotation around the axis which is the central axis of connecting member 14 will produce induced currents which traverse (or attempt to traverse) the joint. Rotation around an axis normal to the axis of connecting member 13 will produce other currents, which do not have to traverse the high-resistance joint. Thus it is possible, as by suitably cutting the copper shells 40 and 42, to make the eddy-current damping different for motions in different directions. In any oscillating system it is desirable to control separately damping of various degrees of freedom; this possibility is thus a useful feature of our invention.

It is evident from inspection of FIG. 1 that the back or outside ends of magnets 24, 26 and 28 present a strong external magnetic field which will be highly attractive to any stray magnetic particles such as 48, which are represented as caught thereby. However, to increase the probability that any such particles will be caught before passing completely through opening 20, and additional magnet 30, shaped like a channel bent into a ring and supported by member 31 may be included in the magnetic array. Its magnetization is in such a direction that the channel flanges are the poles. While, because of its comparatively short path from north to south poles it will contribute comparatively little to the magnetic moment of the entire array, it will make some contribution to it and may therefore appropriately be considered a part of the entire array of magnets. Depending upon the particular application of our invention, it may be desirable to take further advantage of the concentration of flux between the poles of a bent magnet by making some of the magnets of the array horseshoe or similarly shaped magnets rather than straight. Such bent magnets will contribute very much to the repulsive forces tending to keep body 12 free to move but, because much of their flux lies in the short space between and adjacent to their poles, they will contribute less to the magnetic moment of the array than would straight magnets of equal total flux. In applications where strong repulsive forces are desirable (as where the damper is subject in use to strong translational accelerations) it may be desirable to employ a combination of bent and straight magnets to produce strong repulsive forces without proportionally increasing the overall magnetic moment of the array. Similarly, where different values of damping of rotation around different axes are desired, it is possible, instead of or in addition to providing varying conductivities in the conductive part of assembly 12 (in other words, rendering it anisotropic), to provide a large amount of magnetic flux at those parts of assembly 12 which have the longest moment arm from the axis around which it is desired to provide the maximum amount of damping. It is, of course, evident that whatever array of magnets is used, it is necessary that the array provide strong localized fields over more than a hemisphere in order that displacement of central assembly 12 in any direction will encounter a repulsive force having a component tending to restore assembly 12 to its central position.

To a first approximation, it is possible to provide bent magnets to provide the desired repulsive and bearing forces, and to provide bar magnets to provide the desired magnetic moment. This separation of functions may be heightened by mounting the bar magnets comparatively farther away from the spherical member 12 than the bent magnets are mounted; indeed, it is permissible, in this case, to arrange the bar magnets with their poles equidistant from the surface of member 12. However, it is still true that the bent magnets do make some contribution to the net external magnetic moment of the array, and the bar magnets do make some contribution to the repulsion. Therefore for accuracy the entire array must be viewed as one.

The mounting of the magnets of the array is purely a designer's problem. In FIG. 1 the magnets 24, 26, 28 have been represented as mounted by means not represented on bosses or projecting blocks part of housing 22. Channel magnet 30 is represented as supported by members 31 which may be simple separate spokes or may be viewed alternatively as sections of a frustrum of a cone which would have the advantage of forming a shroud against the entrance of stray particles at points not guarded by the magnet 30. It is, of course, desirable in general that mounting materials for magnets be nonmagnetic unless a magnetic material of controlled magnetic properties is deliberately designed into the magnetic circuit.

Certain features not essential to a disclosure of our invention but practically useful have been represented in the drawings: for example, a small vent is represented in assembly 12, diametrically opposite to member 14. This is useful in preventing the existence of any large pressure differential between the inside of assembly 12 and the outside, which might otherwise exist as a result of temperature changes or alterations in the external air pressure. These and other minor deviations from a complete and perfect sphere render it necessary to describe assembly 12 and its component parts as approximately a sphere, or generally spherical.

It is possible, and may be desirable in given applications, to provide an embodiment of our invention with "caging" means to hold the two relatively movable parts rigid with respect to each other during preliminary handling. Since such means are well known in the art, and may be provided in a variety of ways, no benefit would result from possibly confusing the drawings by adding a nonessential and non-novel feature to the representation.

What is claimed is:
1. An oscillation damper comprising:
   a central diamagnetic body provided with means for connection to system whose oscillations are to be damped;
   an array of magnets surrounding the said central body over more than one hemisphere with localized magnetic fields repulsive to the said central body and having a net external magnetic moment for interaction with an external ambient magnetic field; and
   means for damping relative motion between the said central diamagnetic body and the said array of magnets.

2. A damper according to claim 1 in which the said central diamagnetic body is generally spherical.

3. A damper according to claim 1 in which the said means for damping relative motion comprises electrically conductive means rigidly connected to the said central body for the induction of eddy currents.

4. A damper according to claim 3 in which the said electrically conductive means are anisotropic to provide different damping for relative motions in different directions.

5. A damper according to claim 3 in which the said electrically conductive means for the induction of eddy currents is approximately a hollow metal sphere.

6. A damper according to claim 2 in which the said central diamagnetic body is approximately a hollow sphere.

7. A damper according to claim 1 in which the therein said array of magnets provides an external magnetic field to trap magnetic particles moving outside the space between the said array and the therein said central body.

References Cited
UNITED STATES PATENTS

| | | | |
|---|---|---|---|
| 2,622,707 | 12/1952 | Faus | 310—93 |
| 3,033,045 | 5/1962 | Taylor | 74—5.4 |
| 3,114,518 | 12/1963 | Fischell | 310—93 |
| 3,252,340 | 5/1966 | Watt | 74—5.46 |

ROBERT S. MACON, *Primary Examiner.*

H. O. JONES, *Assistant Examiner.*